(12) United States Patent
Mears et al.

(10) Patent No.: US 7,945,930 B2
(45) Date of Patent: May 17, 2011

(54) METHOD AND APPARATUS FOR CONTROLLING A VIDEO SIGNAL PROCESSING APPARATUS

(75) Inventors: Mark Gilmore Mears, Zionsville, IN (US); Aaron Hal Dinwiddie, Cicero, IN (US); Joseph Wayne Forler, Zionsville, IN (US)

(73) Assignee: Thomson-Licensing, Boulogne Billancourt (FR)

( * ) Notice: Subject to any disclaimer, the term of this patent is extended or adjusted under 35 U.S.C. 154(b) by 1193 days.

(21) Appl. No.: 10/512,370

(22) PCT Filed: Apr. 15, 2003

(86) PCT No.: PCT/US03/11739
§ 371 (c)(1),
(2), (4) Date: Oct. 25, 2004

(87) PCT Pub. No.: WO03/092000
PCT Pub. Date: Nov. 6, 2003

(65) Prior Publication Data
US 2005/0169601 A1 Aug. 4, 2005

Related U.S. Application Data

(60) Provisional application No. 60/374,890, filed on Apr. 23, 2002.

(51) Int. Cl.
*G06F 3/00* (2006.01)
*G06F 13/00* (2006.01)
*H04N 5/445* (2006.01)
(52) U.S. Cl. .............. 725/58; 386/46; 386/94; 386/123; 725/86; 348/445; 348/554
(58) Field of Classification Search .................. 348/445, 348/554, 558; 386/94, 123; 725/86, 58, 725/37
See application file for complete search history.

(56) References Cited

U.S. PATENT DOCUMENTS

| 4,890,168 A * | 12/1989 | Inoue et al. ..................... 386/69 |
| 5,428,454 A * | 6/1995 | Kimura et al. ................. 386/123 |
| 2001/0019365 A1* | 9/2001 | Kim et al. ..................... 348/554 |
| 2003/0037335 A1* | 2/2003 | Gatto et al. ..................... 725/86 |

FOREIGN PATENT DOCUMENTS

| EP | 0796012 | 9/1997 |
| JP | 9-284688 | 10/1997 |
| JP | 11-073264 | 3/1999 |

OTHER PUBLICATIONS

Patent Abstracts of Japan, vol. 1999, No. 08, Jun. 30, 1999 & JP 11-073264, Mar. 16, 1999.
Search Report Dated Jul. 28, 2003.

* cited by examiner

*Primary Examiner* — Scott Beliveau
*Assistant Examiner* — Alan Luong
(74) *Attorney, Agent, or Firm* — Robert D. Shedd; Joseph J. Opalach; Reitseng Lin

(57) ABSTRACT

A method for controlling a recording function of a video apparatus improves recording quality by preventing certain display functions of the apparatus from adversely affecting the resultant recording. A problem may arise in certain video signal processing apparatuses when the user selects a recording function after selecting a particular user-activated display function because the user-activated display function may result in the recording of the video signal in an undesired format, for example a different aspect ratio, or zoom mode. According to an exemplary embodiment, the present invention overcomes this problem by providing a method that includes the steps of detecting activation of a recording function of a video apparatus, and turning off a user-activated display function of the video apparatus responsive to the detection.

12 Claims, 3 Drawing Sheets

300

A RECORD TIMER IS SCHEDULED TO RECORD
THE PROGRAM ON THIS CHANNEL.
FOR BEST RECORDING, THE SCREEN
FORMAT IS SET TO NORMAL FOR 4:3 SOURCES,
AND THESE FUNCTIONS SHOULD NOT BE USED:
BROWSER, PROGRAM GUIDE, PIP, OR ZOOM.
NOTE: SOME PROGRAMS ARE COPY PROTECTED AND CANNOT BE RECORDED.
TO STOP THE RECORDING, GO TO PROGRAM GUIDE
AND REMOVE IT FROM THE SCHEDULE.

FIG. 3

METHOD AND APPARATUS FOR CONTROLLING A VIDEO SIGNAL PROCESSING APPARATUS

This application claims the benefit, under 35 U.S.C. §365 of International Application PCT/US03/11739, filed Apr. 15, 2003 which was published in accordance with PCT Article 21(2) on Nov. 6, 2003 in English and which claims the benefit of U.S. Provisional Patent Application No. 60/374,890, filed Apr. 23, 2002.

BACKGROUND OF THE INVENTION

1. Field of the Invention

The present invention generally relates to video signal processing apparatuses, and more particularly, to an apparatus and a method for controlling an operation of a video signal processing apparatus during a recording operation to automatically override a user-activated display function of the apparatus in response to activation of the recording function to thereby provide an output signal in a predetermined format to ensure that the recording is performed with the predetermined format.

2. Background Information

Modern video apparatuses such as television sets often provide users with various user-activated display functions to enhance their viewing experiences. For example, certain video apparatuses provide user-activated display functions such as video sizing functions (e.g., stretch, zoom, normal, etc.), which effectively alter the size of the picture and enable the user to display a desired portion of the image on the display device. Other functions such as a program guide, browser, picture-in-picture (PIP), etc. may also be included among the functions offered by certain video apparatuses. These other functions may be controlled to include the video image in an inset portion of the overall picture.

While such functions are advantageous to users in many respects, they may also adversely affect another important function of the video apparatus, namely the recording function. In particular, if such a display function of a video apparatus is activated during video recording, the resultant recording may be adversely affected because the output signal provided to the recording device, whether included within the video apparatus or connected as an external recording device, may be in the format according to the user-activated display function, which may not be desired format for recording. If the video apparatus is connected to an external recording device, the output signal is generally coupled to the recording device via an output terminal and the recording device is controlled through a control line, for example an IR blaster.

In either case, the activation of the user-activated display function may result in an undesirable recording. For example, a video sizing function which horizontally and/or vertically elongates video images may be utilized to fit video images having an aspect ratio of 4:3 to a screen having an aspect ratio of 16:9. However, if such a function is turned on during video recording, a portion of the original video content will be missing (i.e., cropped) from the resultant recording. This may also occur, for example, if the zoom mode had been activated.

Moreover, if the program guide or browser functions are activated during video recording, no video images or video images having a smaller size than the original video format may be present in the resultant recording. Similarly, if the PIP function is activated during video recording, the resultant recording may include both a main and secondary video images, which may also be undesirable.

Accordingly, there is a need for a method for controlling a video signal processing apparatus, which provides for such user-activated display functions, during recording functions to avoid the foregoing problems and thereby ensure recording the video signal according to a predetermined format.

SUMMARY OF THE INVENTION

The present invention overcomes the problems noted above by providing a video signal processing apparatus and a method for controlling a videos signal processing apparatus, wherein it is determined upon detection of an activation of a recording function, whether a user-activated display function is turned ON, and if so, automatically overriding the user-activated display function to provide an output signal in a predetermined format suitable for recording.

In accordance with an aspect of the present invention, a method for controlling video a video signal processing apparatus is disclosed. According to an exemplary embodiment, the method comprises the steps of: receiving a video signal from a video signal source; processing the video signal to provide an output signal in a first format suitable for display on an imager device; receiving user selection commands via a user input device; providing an output signal in a second format in accordance with one of a plurality of user-activated display functions in response to a user selection of a particular one of the plurality of user-activated display functions; providing the output signal in one of the first and second formats to an output terminal for coupling the output signal to a video signal recording device; and detecting activation of a recording function in response to user selection of the recording function and, in response to the detection, automatically overriding the previous user selection of a particular one of a plurality of user-activated display functions to provide the output signal in the first format to the output terminal.

In accordance with another aspect of the present invention, a video signal processing apparatus is disclosed. According to an exemplary embodiment, the video apparatus comprises: signal input means for receiving a video signal from a video signal source; signal processing means for processing the received video signal to provide an output signal in a first format suitable for display on an imager device; coupling means for coupling the output signal to a video signal recording device; and interface means for receiving a user input, the signal processing means being adapted to provide an output signal in a second format in accordance with one of a plurality of user-activated display functions in response to user selection of a particular one of the plurality of user-activated display functions, the signal processing means adapted to detect the activation of a recording function in response to a user selection of the recording function, the signal processing means automatically overriding a previous user selection of a particular one of a plurality of user-activated display functions to provide the output signal in the first format in response to the detection of the activation of the recording function.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is an exemplary screen message suitable for use in implementing the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
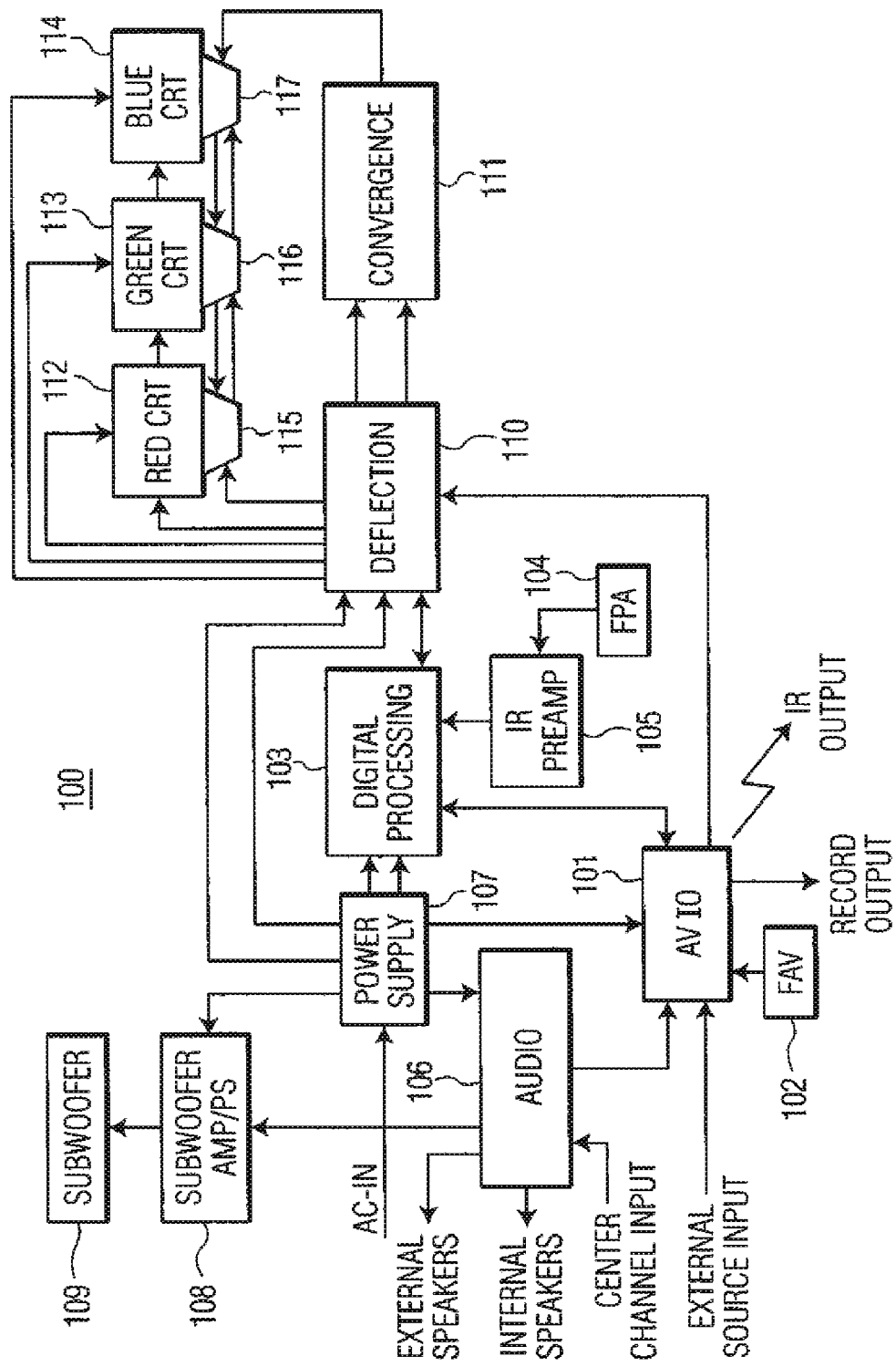
FIG. 1 is an exemplary video signal processing apparatus suitable for implementing the present invention.

Referring now to the drawings, and more particularly to FIG. 1, an exemplary video apparatus 100 suitable for implementing the present invention is shown. For purposes of example and explanation, apparatus 100 represents an exemplary portion of a television signal receiver embodied as a projection screen television. However, it will be intuitive to those skilled in the art that principles of the present invention may be applied to other apparatuses.

The elements of apparatus 100 are generally known to those skilled in the art and will be discussed as necessary for understanding the present invention. As shown in FIG. 1, apparatus 100 comprises an audio/video input/output (AV IO) block 101, a front audio/video (FAV) connector 102, a digital processing block 103, a front panel assembly (FPA) 104, an infrared (IR) preamp 105, an audio block 106, a power supply 107, a subwoofer amp/power supply 108, a subwoofer 109, a deflection block 110, a convergence block 111, CRTs 112 to 114, and yokes 115 to 117. The foregoing elements of FIG. 1 are operatively coupled as indicated by the data lines shown in FIG. 1. As will be intuitive to those skilled in the art, many of the elements represented in FIG. 1 may be embodied using integrated circuits (ICs).

AV IO block 101 is operative to receive and process audio and/or video inputs, and to output processed audio and/or video signals to other elements of apparatus 100, as indicated in FIG. 1. According to an exemplary embodiment, AV IO block 101 receives audio and/or video inputs from an external source of video signals (e.g., via satellite, terrestrial, cable, internet, etc.) and also receives processed audio inputs from audio block 106. According to this exemplary embodiment, AV IO block 101 provides these inputs and outputs composite video signals and all audio signals to digital processing block 103 for additional processing, while outputting component video signals (e.g., 2H, 2.14H, Y, Pr, Pb video information) to deflection block 110. AV IO block 101 is also operative to transmit infrared (IR) output signals that turn a recording device (not shown), which may be coupled to the processed video signals via AV IO 101, ON or OFF, and to provide audio and/or video outputs to the recording device for recording. FAV connector 102 is operative to provide audio and/or video inputs to AV IO block 101. In an alternative embodiment, the recording device may be formed as an integral part of video signal processing apparatus 100. In such a case, apparatus 100 includes a mass storage device, such as a hard disk, or an optical disk, with the appropriate interfaces coupled to digital processing block 103 for reading and writing data, as well as encoding and decoding the data, from the mass storage device.

Digital processing block 103 is operative to perform various digital functions of apparatus 100, such as tuning, demodulation, signal decompression, memory and other functions. Although digital processing block 103 is illustratively shown as a single digital data processing block, it is well known that the functions performed within digital processing block 103 may be implemented using a plurality of well known IC blocks or units, including separate ICs for encoder/decoder, central processing, video signal processing, A/D conversion, D/A conversion, switching between auxiliary and main images for generating PIP images, etc. The techniques and methods for generating the various user-activated display functions, such as zoom, and various aspect ratio pictures, are well known to those skilled in the art and any such techniques and methods may be used in implementing the user-activated display function of the present invention. Also, digital processing block 103 may include sufficient memory to carry out certain functions, and be able to access and control external RAM and ROM (not shown) for carrying out the required video and data processing operations.

Digital processing block 103 outputs processed video signals to deflection and output block 110 which enable a visual display, and may also provide processed video signals to a recording device (not shown) either directly or via AV IO block 101 as indicated in FIG. 1. As will be explained later herein, digital processing block 103 is also operative to enable various user-activated display functions of apparatus 100, such as, but not limited to, a video sizing function, a program guide function, a browser function, a picture-in-picture (PIP) function, or other display function. Moreover, digital processing block 103 is operative to automatically turn off these display functions when a recording function of apparatus 100 is activated in accordance with the method of the present invention. In this manner, a desirable recording format is provided.

FPA 104 includes an interface operative to receive user inputs. The user inputs may be received via known communications links in response to user operation of a remote control device, such as an IR hand-held remote control, a RF remote control device, a wireless keyboard, a wired remote control device, or other similar device. Upon receipt of the user input signals, FPA 104 provides the corresponding decoded control output signals to preamp 105. Preamp 105 is operative to amplify the signals received from FPA 104 and provide the output to digital processing block 103. Digital processing block 103, which may incorporate central processing unit functions as noted above, receives the decoded control signals and performs various operations and controls apparatus 100 in response to the signals.

Audio block 106 is operative to perform various audio processing functions, and to output processed audio signals. According to an exemplary embodiment, audio block 106 receives a center channel input signal and processes the same to generate audio output signals. As indicated in FIG. 1, audio block 106 is operative to provide audio output signals to both external and internal speakers of apparatus 100. Additionally, audio block 106 provides audio output signals to AV IO block 106, and also provides subwoofer audio signals to subwoofer amp/power supply 108.

Power supply 107 is operative to receive an input alternating current power signal (AC-IN), and to output voltage signals which power the various elements of apparatus 100, as indicated in FIG. 1. According to an exemplary embodiment, power supply 107 provides such voltage signals to AV IO block 101, digital processing block 103, audio block 106, subwoofer amp/power supply 108, and deflection block 110. Subwoofer amp/power supply 108 is operative to amplify the subwoofer audio signals provided from audio block 106, and provide the amplified subwoofer audio signals to subwoofer 109. Subwoofer amp/power supply 108 also outputs a voltage signal to subwoofer 109, which serves as its power supply. Subwoofer 109 is operative to aurally output the amplified subwoofer audio signals provided from subwoofer amp/power supply 108.

Deflection and output block 110 is operative to control deflection functions of apparatus 100. According to an exemplary embodiment, deflection block 110 outputs deflection control signals to yokes 115 to 117 which control horizontal and vertical deflection of the high-intensity beams generated by CRTs 112 to 114, respectively. Deflection block 110 is also operative to output color signals to CRTs 112 to 114 responsive to the processed video signals and other control signals provided from digital processing block 103. Also according to an exemplary embodiment, deflection block 110 is operative to output voltage signals to convergence block 111 and CRTs 112 to 114 for their power supplies.

Convergence block 111 is operative to control convergence functions of apparatus 100. According to an exemplary embodiment, convergence block 111 outputs convergence control signals to yokes 115 to 117, as indicated in FIG. 1, which control a positive convergence adjustment for precisely focusing the high-intensity beams emitted from CRTs 112 to 114 on a screen (not shown).

CRTs 112 to 114 are operative to generate high-intensity red, green and blue beams, respectively, for display on a screen responsive to the color control signals from deflection block 110. Yokes 115 to 117 are operative to control CRTs 112 to 114, respectively, responsive to the deflection control signals from deflection block 110 and the convergence control signals from convergence block 111.

Figure 2:
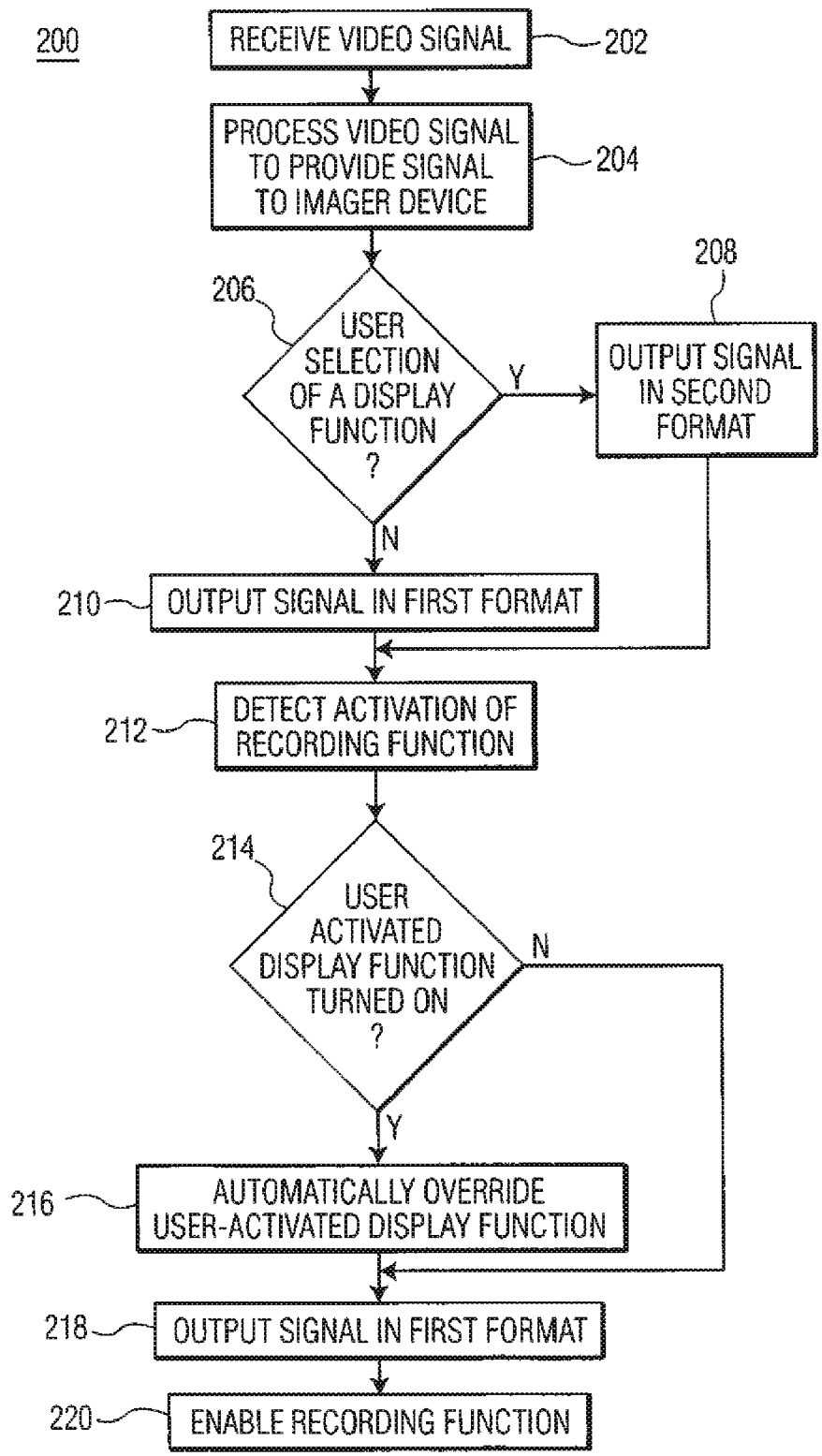
FIG. 2 is a flowchart illustrating exemplary steps for implementing a method according to the present invention.

Turning now to FIG. 2, a flowchart 200 illustrating exemplary steps according to one aspect of the present invention is shown. For purposes of example and explanation, the steps of FIG. 2 will be described with reference to apparatus 100 of FIG. 1. Accordingly, the steps of FIG. 2 are merely exemplary, and are not intended to limit the present invention in any manner.

At step 201, apparatus 100 receives a video signal from a video signal source, such as over the air transmission, cable, satellite, etc. According to an exemplary embodiment, digital processing block 103 detects the video signal and processes the received signal to generate output video signals that are applied to deflection and output block 110 to generate an image. The output video signals may also be coupled to another apparatus, such as a recording device via the record output of AV IO 101. The output video signals are provided in a first format, which may be a default format according to the screen aspect ratio. The digital processing block 103 may be configured to provide the video signal in the first format in the absence of user selection of another video display format.

In step 206, it is determined whether the user has selected another display format, such as zoom, or elongation. If so, digital processing block 103 processes the received video signal as necessary to provide the output signal in a second format in accordance with the user selection in step 208. If not, digital processing block 103 processes the received video signal as necessary to provide the output signal in a first, or default, format, or in accordance with a previous user selection in step 210.

In step 212, activation of a recording function of apparatus 100 is detected. According to an exemplary embodiment, digital processing block 103 may detect this condition when an internal recording timer (not shown) is triggered, thereby indicating the start of the recording function. The recording function may, for example, be activated immediately following a user input (e.g., record start command) to apparatus 100, or alternatively, in accordance with a programming function of apparatus 100 whereby a user provides inputs that cause the recording function to be activated at some time in the future (e.g., the next day, etc.). According to an exemplary embodiment, a user may provide such inputs to apparatus 100 via an electronic program guide that is displayed.

At step 214, a determination is made as to whether a user-activated display function of apparatus 100 is currently selected. In the apparatus according to the present invention, a user-activated display function may be kept, for all channels, selected groups of channels, or individual channels, until the user either selects a new user-activated display function or deactivates the previously selected user-activated display function. According to an exemplary embodiment, digital processing block 103 enables the various user-activated display functions of apparatus 100, and therefore makes the determination at step 214 based on its current settings (e.g., by using internal flag settings indicative of the activated display functions). As previously indicated herein, such a user-activated display function may comprise a video sizing function, a program guide function, a browser function, a PIP function, or other display function which may adversely affect recording quality if kept on during recording. As referred to herein, a display function is "user-activated" if it is capable of being turned ON (i.e., activated) by user input while apparatus 100 is turned ON.

According to an exemplary embodiment, there are at least two different video sizing functions, including a stretch function and a zoom function, which may be turned on responsive to a user input to apparatus 100. The stretch function enables horizontal elongation of a video image, while the zoom function enables both horizontal and vertical elongation of a video image. The stretch and zoom functions may for example effectively elongate a video image by a predetermined percentage (e.g., 33%, 50%, etc.) over its normal size. Accordingly, the stretch and zoom functions may be used to elongate a video image having an aspect ratio of 4:3 in order to a fill a screen having an aspect ratio of 16:9. Other sizing functions that stretch the video in a non-linear manner, for example, a Cinerama function, wherein the image is stretched more for video that is closer to the right and left edges of the picture, or those that reduce the size of a video image, may also be provided according to the present invention.

According to an exemplary embodiment, the program guide function may be turned on responsive to a user input to apparatus 100 and enables display of a menu that provides program information such as program titles, program start/end times, program advertisements, etc. Fixed portions of the program guide may for example be stored as a bitmap image within digital processing block 103, while other portions of the program guide, such as program information, may be updated periodically based on external data provided to apparatus 100. Once the program guide is displayed, a user may for example provide inputs through the program guide to perform various functions of apparatus 100, such as tune to a particular television program, activate the recording function, and other functions.

According to an exemplary embodiment, the browser function may be turned on responsive to a user input to apparatus 100 and enables display of a menu through which the user may access a network, such as the internet. Fixed portions of the browser may also be stored as a bitmap image within digital processing block 103, while other portions of the browser, such as news information and the like, may be updated periodically based on external data provided to apparatus 100. Once the browser is displayed, a user may for example provide inputs through the browser to search the internet.

According to an exemplary embodiment, the PIP function may be turned on responsive to a user input to apparatus 100 and enables a secondary video image to be overlaid upon a main video image, thereby allowing the user to simultaneously view two different programs. The PIP function typically requires digital processing block 103 to be equipped with dual tuners. As previously indicated, display functions other than those expressly described herein may also be provided in accordance with the present invention.

When the determination at step 214 is positive, process flow advances to step 216 wherein apparatus 100 automatically overrides the user-activated display function and provides an output signal in a first, or default, format in step 218. According to an exemplary embodiment, digital processing block 103 is programmed to generate a control signal responsive to detecting activation of the recording function of apparatus 100, which automatically turns off all such display functions to provide an output signal in a first, or default, format, which is suitable for recording.

Accordingly, if a video sizing function, which horizontally and/or vertically elongates video images is selected, digital processing block 103 overrides the function and thereby resets the video image format back to its normal, or default, setting. This prevents portions of the original video content from being cropped during recording. Similarly, if another display function such as the program guide, browser or PIP function is selected, digital processing block 103 turns the function off and thereby prevents such display functions from adversely affecting the resultant recording, for example, by preventing the video image being recorded with the browser.

After step 218, process flow advances to step 220 where the recording function is enabled. According to an exemplary embodiment, digital processing block 103 is programmed to enable the recording function after any user-activated display function is turned off at step 216, and the output signal is provided in the first, or default, format in step 218. In particular, digital processing block 103 enables the recording function at step 220 by sending the output signal to AV IO block 101, which may be coupled to a recording device (not shown), such as a video cassette recorder (VCR), personal video recorder (PVR) or other recording device. Digital processing block 103 may also generate a control signal which causes AV IO block 101 to transmit an IR signal to turn on the recording device. In the aforementioned manner, the recording function of apparatus 100 is performed only after any display function which may adversely affect the quality of the recording is turned off.

According to an exemplary embodiment, a screen message may be provided just before or after the recording function begins to inform the user of why the channel tune occurred and what actions should be avoided in order to make a "clean" recording. An example of such a message is shown in FIG. 3. As indicated in FIG. 3, screen message 300 informs the user regarding the recording function and advises against activating certain display functions which may adversely affect recording quality. Of course, screen message 300 is merely exemplary, and other types of messages may also be provided according to the present invention.

After the recording function is complete, apparatus 100 remains tuned to the recording channel and any user-activated display function remains turned OFF. However, upon playback of the recording, a user may activate any such display function as desired. According to an alternative embodiment, the user-activated function may be automatically turned back ON upon completion of the recording function.

As described herein, the present invention provides a method for controlling a recording function of a video apparatus by automatically turning off a user-activated display function of the apparatus when the recording function is activated. As a result, a "clean" recording free from any adverse affects of such display functions is achieved.

The present invention is particularly applicable to various apparatuses, either with or without a display device. Accordingly, the phrases "video apparatus" or "television signal receiver" as used herein may refer to systems or apparatuses including, but not limited to, television sets, computers or monitors that include a display device, and systems or apparatuses such as set-top boxes, VCRs, digital versatile disk (DVD) players, video game boxes, PVRs, computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling video signal processing apparatus, comprising:
   receiving a video signal from a video signal source;
   processing the video signal to provide an output signal in a first format suitable for display on an imager device;
   receiving user selection commands via a user input device;
   providing an output signal in a second format in accordance with one of a plurality of user-activated display functions in response to a user selection of a particular one of the plurality of user-activated display functions;
   wherein the user-activated display function comprises a video sizing, including the video signal within an electronic program guide display and generating a picture-in-picture display;
   providing the output signal in one of the first and second formats to an output terminal for coupling the output signal to a video signal recording device; and
   detecting activation of a recording function in response to user selection of the recording function and, in response to the detection of the activation of the recording function,
   detecting whether the particular one of the plurality of user-activated display functions is on, and if on, automatically overriding the previous user selection of a particular one of a plurality of user-activated display functions to provide the output signal in the first format to the output terminal.

2. The method of claim 1, wherein the video sizing includes a horizontal elongation.

3. The method of claim 2, wherein the video sizing includes a vertical elongation function.

4. The method of claim 1, wherein the user-activated display function comprises including the video signal within a browser display.

5. The method of claim 1, further comprising the step of receiving a second video signal from the video signal source.

6. The method of claim 1, further comprising the steps of transmitting a control signal to enable the recording function in the video signal recording device after overriding the user-activated display function, and re-enabling the user-activated display function after completion of the recording function.

7. A video signal processing apparatus, comprising:
   signal input means for receiving a video signal from a video signal source;

signal processing means for processing the received video signal to provide an output signal in a first format suitable for display on an imager device;

coupling means for coupling the output signal to a video signal recording device; and interface means for receiving a user input, said signal processing means adapted to provide an output signal in a second format in accordance with one of a plurality of user-activated display functions in response to user selection of a particular one of the plurality of user-activated display functions wherein the user-activated display function comprises a video sizing, including the video signal within an electronic program guide display and generating a picture-in-picture display;

said signal processing means adapted to detect the activation of a recording function in response to a user selection of the recording function, and, in response to the detection of the activation of the recording function, to detect whether the particular one of the plurality of user-activated display functions is on, and if on, said signal processing means automatically overriding a previous user selection of a particular one of a plurality of user-activated display functions to provide the output signal in the first format in response to the detection of the activation of the recording function.

8. The video signal processing apparatus of claim 7, wherein the video sizing function includes an elongation.

9. The video signal processing apparatus of claim 7, wherein the user-activated display function comprises a including the video signal within a browser display.

10. The video signal processing apparatus of claim 7, wherein the signal input is adapted to receive a second video signal, the signal processing means is adapted to process the second video signal, and the user-activated display function comprises generating a picture-in-picture display.

11. The video signal processing apparatus of claim 7, wherein the signal processing means generates a control signal to enable the recording function after overriding the user-activated display function in response to the detection of the recording function.

12. The video signal processing apparatus of claim 11, wherein the signal processing means re-enables the user-activated display function to provide the output signal in the second format after the recording function is complete.

\* \* \* \* \*